Patented June 28, 1932

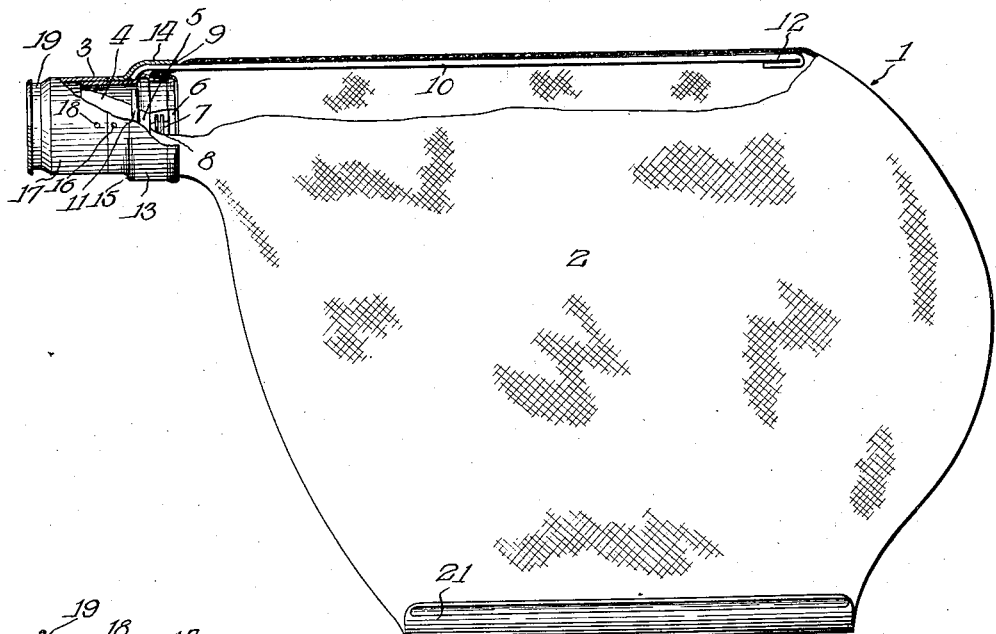
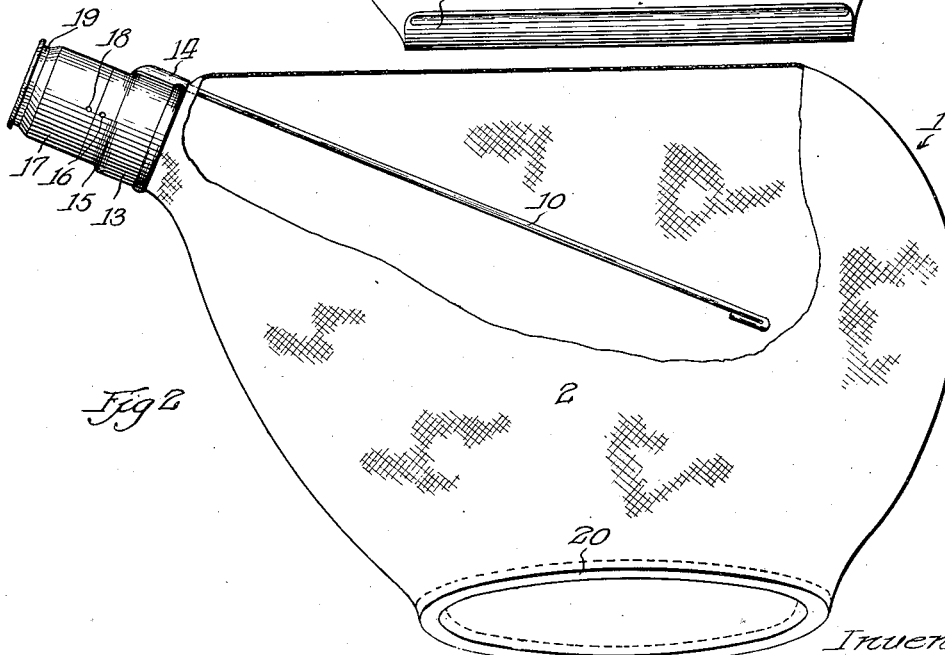

1,864,782

UNITED STATES PATENT OFFICE

HARRY B. WHITE, OF CANTON, OHIO, ASSIGNOR TO THE HOOVER COMPANY, A CORPORATION OF OHIO

SUCTION CLEANER

Application filed January 20, 1930. Serial No. 421,900.

The invention has to do with suction cleaners and more particularly with dust separators for suction cleaners.

In the preferred embodiment the invention comprises an improvement in the construction of dust separators through the provision of a member within the dust bag which functions both as a bag support, when the separator is in position upon a cleaner, and as a means of assisting in the removal of the collected foreign matter in the bag when said bag is being cleaned. The present invention is particularly applicable to dust separators used with the small portable hand-type cleaner, as in that type of construction there is no relatively long handle from which the bag can be suspended and it is necessary, if the bag is to retain a definite and pleasing shape, to provide some means which will take the place of the missing handle support.

A dust separator for a suction cleaner performs the well known function of removing the foreign matter from the air which has passed through the cleaner, said foreign matter having been picked up as the air passed over the object undergoing cleaning, and permitting the air to escape into the outer atmosphere. Upon the continued use of the cleaner for a considerable length of time the aggregate of the deposited foreign matter upon the inner surface of the dust bag becomes so great, and is so well distributed, that the resistance to the passage of the air through the filter material comprising the dust bag is materially increased. Such an increase in the resistance to the passage of air is commonly known as an increase in the back pressure. The increased back pressure has the deleterious effect of reducing the effective suction of the cleaner and so its effectiveness in performing its cleaning operation. When such a condition has arisen it becomes necessary to remove the collected foreign matter from the interior of the dust bag in order that it may be again returned to a condition in which the back pressure is not too burdensome.

In a dust separator constructed in accordance with applicant's invention the cleaning operation of the dust bag is made easier and more complete by the new and novel supporting means which has been incorporated therein and which functions as a beater and scraper in the cleaning operation of the bag.

It is an object of the invention therefore, to provide a new and novel dust separator construction. It is a further object to provide a new and novel supporting means for dust bags. It is a still further object to provide a new and novel supporting means for dust bags which functions not only as a support but as an agent to aid in the effective removal of the foreign substance from the dust bag when the dust bag is undergoing cleaning.

Referring now to the accompanying drawing:

Figure 1 discloses a side view of a dust separator embodying the present invention, with certain parts broken away, the bag being in the normal position in which it would be found upon the cleaner;

Figure 2 discloses a side view, with certain parts broken away, of a dust bag in one of the stages of its cleaning operation.

In the drawing the reference character 1 refers generally to a dust separator constructed in accordance with the present invention. Dust separator 1 comprises a bag proper, indicated by the reference character 2, which is made of suitable filtering material and which is shaped as shown. The material of the bag 2 is flexible and without rigidity, being easily deformed, and extends, in its operative deflated position in substantially a single plane. At an upper corner the dust bag is provided with an inlet opening to which a fitting, indicated generally by the reference character 3, is attached. Fitting 3 comprises an inner cylinder 4 which is provided with spaced protruding ridges, indicated by the reference characters 5 and 6, between which the edge 7 of the bag inlet is positioned and secured by means of a fine wire wrapping, indicated by the reference character 8.

Overlying the ridges 5 and 6 of the cylinder 4 and freely extending within the bag 2 through a small opening 9 is a relatively rigid straight wire or rod 10 whose length is equal to the length of the upper edge of the bag 2. Rod 10 is provided with a circular loop 11 at its outer end which closely encircles the cylinder 4 and seats against the ridge or shoulder 5 thereon. At its inner end rod 10 is doubled back on itself, as at 12, so that the cloth material forming the bag cannot be torn or injured in any way by contact therewith.

Telescopically positioned on the inner end of cylinder 4 is an outer cylinder 13 which is of sufficiently great diameter at its inner or bag end so that it snugly encloses the protruding ridges 5 and 6 of cylinder 4 and functions to further secure the lapped edge 7 of the dust bag 2 therebetween. The rod 10 extends between the cylinder 13 and the protrusions 5 and 6 of cylinder 4 in an axially extending raised portion 14 formed in cylinder 13 to accommodate it. A shoulder 15, in cylinder 13, separates the enlarged portion of that cylinder overlying ridges 5 and 6 from the reduced portion which encloses the cylinder 4 and further serves to secure the looped end of wire 10 in place against ridge 5. Securing means such as small rivets 16 are provided which securely fasten cylinder 13 to the inner cylinder 4.

A second outer cylinder, indicated by the reference character 17, is positioned upon the end of cylinder 4 contacting the end of cylinder 13, being securely held in place by securing means 18 which connect it to the inner cylinder. Cylinder 17 is provided, at its outer end, with a reduced neck portion 19 which is adapted to coact with suitable securing means carried by a suction cleaner to firmly secure the combined construction to said cleaner.

Positioned in the periphery of the bag proper 2 at some point removed from the inlet opening is a discharge outlet, indicated by the reference character 20, in Figure 2. In the normal operation of the bag, as attached to a cleaner, the sides of opening 20 are firmly secured together by means of a resilient U-shaped clamping member 21 which is adapted to slide over the edges of the opening 20 in a manner common in the art. It is through opening 20 that the foreign matter is discharged when the bag is undergoing its cleaning operation, opening 20 being of considerably greater diameter than the inlet opening and more suitable for that purpose.

In the use of a dust bag constructed in accordance with the present invention fitting 3 is secured to the exhaust outlet of the cleaner through the cooperation of the groove 19 with attaching means on the cleaner. The fitting rigidly supports the end of rod 10 attached to it and rod 10 functions, throughout its length within the bag, to support the upper edge of the bag and to prevent its sagging. With the air being exhausted from the cleaner, the sides of the bag are distended and the bag appears balloon-like in proportions. The rod or wire 10 is not permanently attached to the upper edge of the bag 2 as there is no connection therebetween except at the point where the rod enters the bag.

Upon the completion of the cleaning operation fitting 3 is disconnected from the suction cleaner proper in order that the bag may be cleaned. Referring to Figure 2, in particular, the cleaning operation is clearly illustrated. The resilient spring-retaining member 21 has been removed from the discharge opening 20 and the sides of the opening spread apart to provide the maximum aperture. The party performing the cleaning operation, in order to avoid coming into contact with the dirt and dust to be precipitated through the opening 20, would hold the separator by means of the fitting 3 and the bag corner opposite thereto, namely, near the end of the rod 10. A certain part of the foreign matter contained in the dust bag, can be forced through the opening 20 by merely shaking the bag and this is the procedure that would of necessity be followed in an ordinary separator not constructed in accordance with applicant's invention. Mere shaking, however, would fail to dislodge a large proportion of the foreign matter which, being fibrous and inclined to adhere to the cloth forming the dust bag, would refuse to fall through the opening 20 and, unless the party performing the cleaning operation was willing to insert his hand through the opening 20 to grasp and scrape off said foreign matter, the bag would not be efficiently cleaned. According to applicant's invention, however, the party cleaning the bag can, by grasping the fitting as a handle and holding the bag at its opposite corner, deflect the wire rod 10 within the bag merely by bending at the bag neck and can use the extending wire rod as a beater or scraper by continuously flexing in an obvious manner. A thorough beating may be administered in this way to the inner surface of the dust bag and all foreign particles dislodged. The angle through which the wire rod 10 may be deflected within the bag coupled with the flexibility of the bag permits of its contacting substantially the entire inner surface thereof. The result of the thorough cleaning of the bag is a reduced resistance to the passage of cleaning air through said bag when in use and, as aforedescribed, is of great value.

Applicant has provided in a simple construction, a dust separator which combines simplicity and effectiveness in the usual functions which a dust separator is adapted to perform and which further contains within itself the means for its own complete cleaning.

Having clearly set forth and described my invention, I claim:—

1. A dust separator for suction cleaners comprising a bag composed of filtering material, a fitting which is secured to the inlet of the bag and is adapted to be secured at its opposite end to the outlet of a suction cleaner and means carried by said fitting and extending within said bag for supporting said bag when in use and movable relative to said bag for beating the interior thereof when detached from the cleaner and being cleaned.

2. A dust separator for suction cleaners comprising a bag composed of filtering material and having an inlet and outlet, a fitting which is secured to the inlet of the bag and is adapted to be secured at its opposite end to the outlet of a suction cleaner and means to support said bag comprising a relatively rigid rod carried by said fitting extending freely into said bag and being movable relative to said outlet.

3. A dust separator for suction cleaners comprising a bag composed of filtering material and having an inlet and outlet, a fitting which is secured to the inlet of the bag and is adapted to be secured at its opposite end to the outlet of a suction cleaner and means to support said bag comprising a straight rod carried by said fitting which rod freely extends into said bag and is movable relative to said outlet.

4. A dust separator for suction cleaners comprising a bag composed of flexible filtering material, a connector positioned within the inlet of said bag and adapted to be secured to the exhaust outlet of a suction cleaner, said connector comprising an inner member provided with spaced circumferential ribs between which the edges of the bag inlet are secured, an outer member telescoped over said inner member which includes a section of increased diameter which overlies the ribs of said inner member, and a second outer member telescoped over the protruding end of said inner member and provided with a connecting portion at its outer end.

5. In combination in a dust separator for a suction cleaner, a bag composed of filtering material and provided with inlet and discharge openings, a rigid member provided with a loop at its outer end extending within said bag and a fitting connected to said inlet opening and to said rigid member, said fitting comprising an inner cylindrical member provided with spaced extruded portions between which the edge of said bag inlet is secured, the outer end of said cylindrical member serving as a seat for the loop of the rigid member, and an outer cylindrical member including a section of increased diameter telescopically positioned on said inner member and securing said loop adjacent its seat, and a second outer member telescopically arranged over the protruding outer end of said inner cylindrical member and provided with a connecting portion at its outer end.

Signed at North Canton, in the county of Stark and State of Ohio, this 13th day of January, A. D. 1929.

HARRY B. WHITE.